(12) United States Patent
Hiltunen et al.

(10) Patent No.: US 7,003,283 B2
(45) Date of Patent: Feb. 21, 2006

(54) SHORT MESSAGING USING INFORMATION BEACONS

(75) Inventors: Miska Hiltunen, Witten (DE); Jarkko Lempiö, Nokia (FI)

(73) Assignee: Nokia Corporation, Espoo (FI)

( * ) Notice: Subject to any disclaimer, the term of this patent is extended or adjusted under 35 U.S.C. 154(b) by 82 days.

(21) Appl. No.: 10/783,062

(22) Filed: Feb. 20, 2004

(65) Prior Publication Data
US 2004/0162059 A1 Aug. 19, 2004

Related U.S. Application Data

(63) Continuation of application No. 09/612,872, filed on Jul. 10, 2000, now Pat. No. 6,754,484.

(51) Int. Cl.
H04M 3/16 (2006.01)
(52) U.S. Cl. .................... 455/412.1; 455/413; 455/440
(58) Field of Classification Search ............ 455/412.1, 455/413, 414.1, 414.3, 440, 456.1, 456.3, 455/466
See application file for complete search history.

(56) References Cited

U.S. PATENT DOCUMENTS

| | | | | |
|---|---|---|---|---|
| 5,592,533 A | * | 1/1997 | McHenry et al. ........ | 455/435.2 |
| 6,014,559 A | * | 1/2000 | Amin .................... | 455/413 |
| 6,046,992 A | | 4/2000 | Meier et al. | |
| 6,091,956 A | * | 7/2000 | Hollenberg ............. | 455/456.5 |
| 6,144,848 A | * | 11/2000 | Walsh et al. ............ | 455/419 |
| 6,377,608 B1 | * | 4/2002 | Zyren ................... | 375/132 |
| 6,513,015 B1 | * | 1/2003 | Ogasawara .............. | 705/26 |
| 6,526,275 B1 | * | 2/2003 | Calvert ................. | 455/418 |
| 6,571,279 B1 | * | 5/2003 | Herz et al. ............. | 709/217 |
| 6,587,835 B1 | * | 7/2003 | Treyz et al. ............ | 705/14 |
| 6,595,417 B1 | * | 7/2003 | O'Hagan et al. ......... | 235/383 |
| 6,665,379 B1 | * | 12/2003 | Brown et al. ........... | 379/88.18 |
| 6,714,797 B1 | * | 3/2004 | Rautila ................. | 455/552.1 |
| 2002/0086663 A1 | * | 7/2002 | Tang et al. ............. | 455/414 |

FOREIGN PATENT DOCUMENTS

| WO | WO 00/69186 | 11/2000 |
|---|---|---|
| WO | WO 01/13660 | 2/2001 |

* cited by examiner

*Primary Examiner*—William Trost
*Assistant Examiner*—James D Ewart
(74) *Attorney, Agent, or Firm*—Cohen, Pontani, Lieberman & Pavane

(57) ABSTRACT

A short messaging communication system for communicating short messages to a user located in an operating region of the system. Information beacons or beacons which function as store and forward devices operable in a corresponding local operating region communicate with terminal devices that are located within the local operating region. Short messages can be "private" messages wherein only specified recipients are permitted access, or "public" messages whose access is not limited to specific users. A message stored on a beacon can be retrieved by a recipient when the recipient's presence in the operating range is detected, whereupon the beacon will wirelessly transmit the message to the recipient device. For private messages, a password or other security access code may be required for input into the receiving device to decipher the received message.

21 Claims, 6 Drawing Sheets

SHORT MESSAGING USING INFORMATION BEACONS

This is a continuation of application Ser. No. 09/612,872, filed Jul. 10, 2000 now U.S. Pat. No. 6,754,484.

BACKGROUND OF THE INVENTION

1. Field of the Invention

The present invention relates to local communication networks and, more particularly, to wireless short message communication systems.

2. Description of the Related Art

The availability of various types of wireless communication devices produces a need to have these devices interact with each other in a manner which is cost efficient and which can be easily implemented. Such communication can occur in GSM systems using SMS wherein short messages are communicated directly between two or more terminal devices, such as mobile stations, e.g. telephones, PDAs, etc. Terminal devices can also communicate with each other using infrared signals or radio frequency (RF) signals.

Recently, low power RF systems have been proposed for providing communications between a plurality of transceivers through a short-range radial link having a broadcast range of several meters. One such local RF system is currently under development and is referred to as "Bluetooth". This system will be commercially available in the near future and is designed to operate in the open spectrum, around 2.4 gigahertz. The Bluetooth system will allow for devices such as mobile phones, computers, and other types of terminal devices which are located within an operable range of the RF system to communicate with each other.

Wireless relay networks also exist which, in effect, extend an operating range of a local RF system by utilizing relay devices to interface with and provide communication between two or more terminal devices. Such a network is disclosed in PCT Application No. WO 98/17032, wherein a plurality of communication nodes are wirelessly connected to each other and to a host device for providing numerous communication links for data to be communicated between the host and terminal devices interfaced with the nodes. Such systems do not, however, make transmission of communications dependant on a location of an intended recipient, which is a desired and worthwhile feature in many circumstances.

SUMMARY OF THE INVENTION

The present invention is directed to a short messaging service for use with one or more information transceiver beacons. The beacons have a corresponding local geographic operating area defining a region in which the beacon can wirelessly communicate with a terminal device contained in the operating area. A short message is stored on a subject beacon for receipt by one or more intended recipients. When a terminal device of an intended recipient enters the operating area of the subject beacon, the message is transmitted by the beacon to the terminal device. The beacons may be stand alone devices or may be incorporated in a wireless local area network having a plurality of wireless transceiver beacons in communication with each other.

In a preferred embodiment, the stored short message may contain a security access feature to allow access only to one or more intended recipients, which may be accomplished by entering a security code in the terminal device of the intended recipient to the beacon. The message may be transferred from a terminal device directly to a subject beacon, or indirectly via a first beacon or a host in communication with the subject beacon, or from a device outside of the network by accessing a beacon or the network through a corresponding access address.

In another preferred embodiment, the message may contain a time limitation parameter for establishing a time period during which the message will be available. In the event transmission does not occur within the preset time period, the message will be deleted. If successful transmission occurs within the time period, the message will also be deleted.

In still another preferred embodiment, the message may be a public message accessible by any recipient that enters the operating region of the beacon. Such a message may be used, for example, in advertising by conveying information concerning a promotional offer by a particular retail establishment located in the operating region of the beacon.

In yet another embodiment, a message may be broadcast to a plurality of beacons in communication with each other and the message will be transmitted from any one of the plurality of the beacons to an intended recipient device when the intended device is detected within a transmission area of any of the plurality of beacons. Once the message is successfully transmitted, it will be removed from all of the beacons in the plurality.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
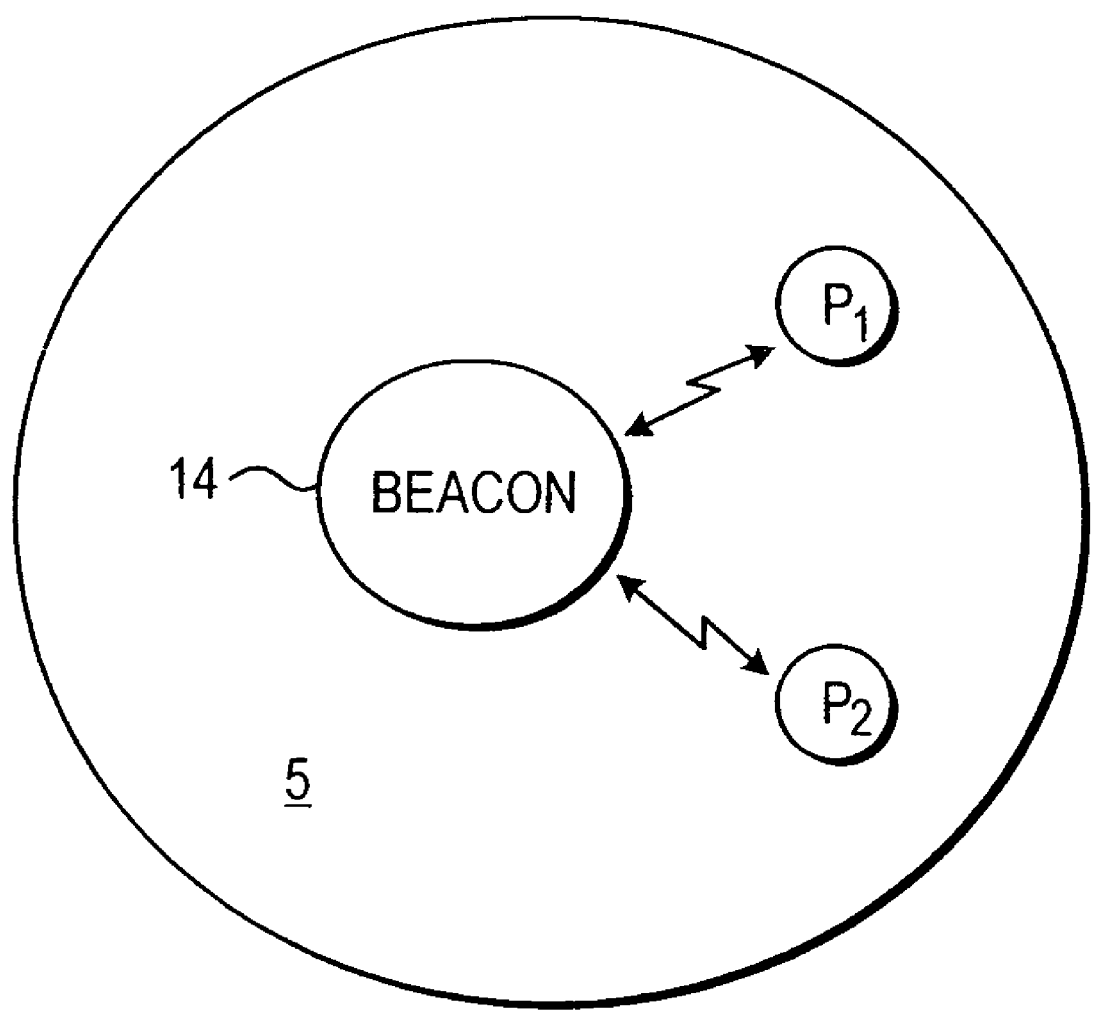
FIG. 1 is a graphical representation of a system for communicating short messages in accordance with the present invention.

FIG. 1 depicts an information beacon 14 operable in an operating range 5 for communicating with one or more wireless terminal devices, such as PDAs or mobile phones $P_1$, $P_2$ which are located within the operating range 5. The term beacon refers to a wireless store/forward transceiver relay device, as explained more fully below, for storing short messages and transmitting the stored messages to one or more terminal devices.

Figure 2:
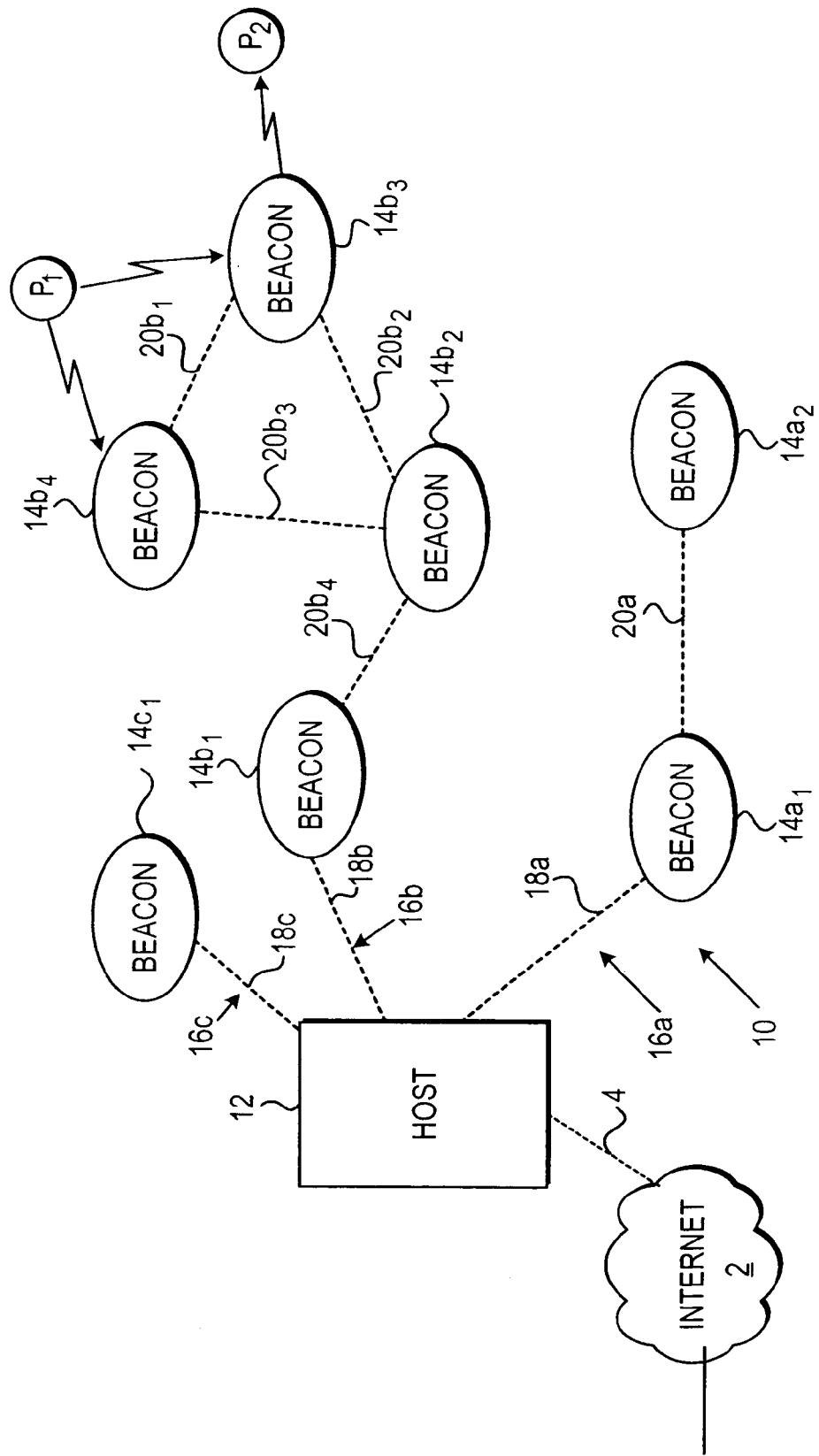
FIG. 2 is a schematic representation of a short range RF network for use in accordance with a preferred embodiment of the present invention.

In one embodiment, a network of beacons 14 may be employed in a short range RF network or local area network (LAN) 10 illustrated in FIG. 2. Network 10 includes a plurality of wireless transceiver beacons 14 connected either directly or indirectly to a host 12 through a plurality of communication paths 16. In the example shown in FIG. 2, three direct paths, 16a, 16b and 16c, are generally shown for connecting the beacons 14a, 14b, 14c, to the host 12. Each communication path is made up of a direct link 18a, 18b, 18c, defined as a wireless connection between the host 12 and a beacon $14a_1, 14b_1, 14c_1$, and may include one or more indirect links 20a and $20b_1$–$20b_4$, defined as a wireless connection between two beacons. In the network 10, path 16a is made up of a direct link 18a between beacon $14a_1$ and host 12, and an indirect link 20a between beacons $14a_2$ and $14a_1$. Thus, beacon $14a_2$ communicates with host 12 only through the use of beacon $14a_1$ in path 16a. Path 16c includes only a single direct link 18c between beacon $14c_1$ and host 12. As for path 16b, this includes a direct link 18b between beacon $14b_1$ and host 12 and also contains a plurality of indirect links $20b_1, 20b_2, 20b_3$ and $20b_4$, which provide a communication path between host 12 and beacons $14b_2, 14b_3$ and $14b_4$.

As shown in path 16b, certain beacons establish multiple communication links through which communication with the host 12 can occur. For example, beacon $14b_3$ can communicate with beacon $14b_1$ and, ultimately, with host 12 through either beacon $14b_2$ via intermediate paths $20b_2$ and $20b_4$ or through beacons $14b_4$ and $14b_2$ through intermediate paths $20b_1, 20b_3$ and $20b_4$.

The host 12 is responsible for routing data to the beacons in the network 10 and may interface the network 10 with an external network such as the Internet 2, in a manner well-known to those having ordinary skill in the art. For example, the interface can be a connection 4 which may be a fiber optic or other "hard-wired" connection scheme, wireless low power RF connections (e.g. Bluetooth), cellular connection, infrared and modem. The host 12 is preferably a personal computer having low power RF communication ability including custom designed software for network administration. The host serves as a central maintenance unit for storing a running inventory register of beacons, as explained below, to which the host is connected, as well as the manner in which the beacons are connected to each other, e.g., through direct links 18a, 18b, 18c or indirect links 20. The inventory register can be based, for example, on Bluetooth device addresses. Moreover, the host 12 can interface with one or more additional hosts (not shown) depending on the requirements or demands of the network 10.

The beacons 14 are relatively small, portable transceiver devices which communicate data between themselves and the host 12 along direct links 18 and indirect links 20 of communication paths 16 in the network 10. Each beacon 14 includes an RF receiver and transmitter capable of receiving and transmitting data over the operative range of the RF receiver. For example, if Bluetooth technology is employed, the operating range of each beacon and, consequently, the distance between adjacent beacons in a network (i.e. the length of each link) using current technology is in the range of approximately 10 meters for a normal power mode and 300 meters for a high power mode.

Figure 4:
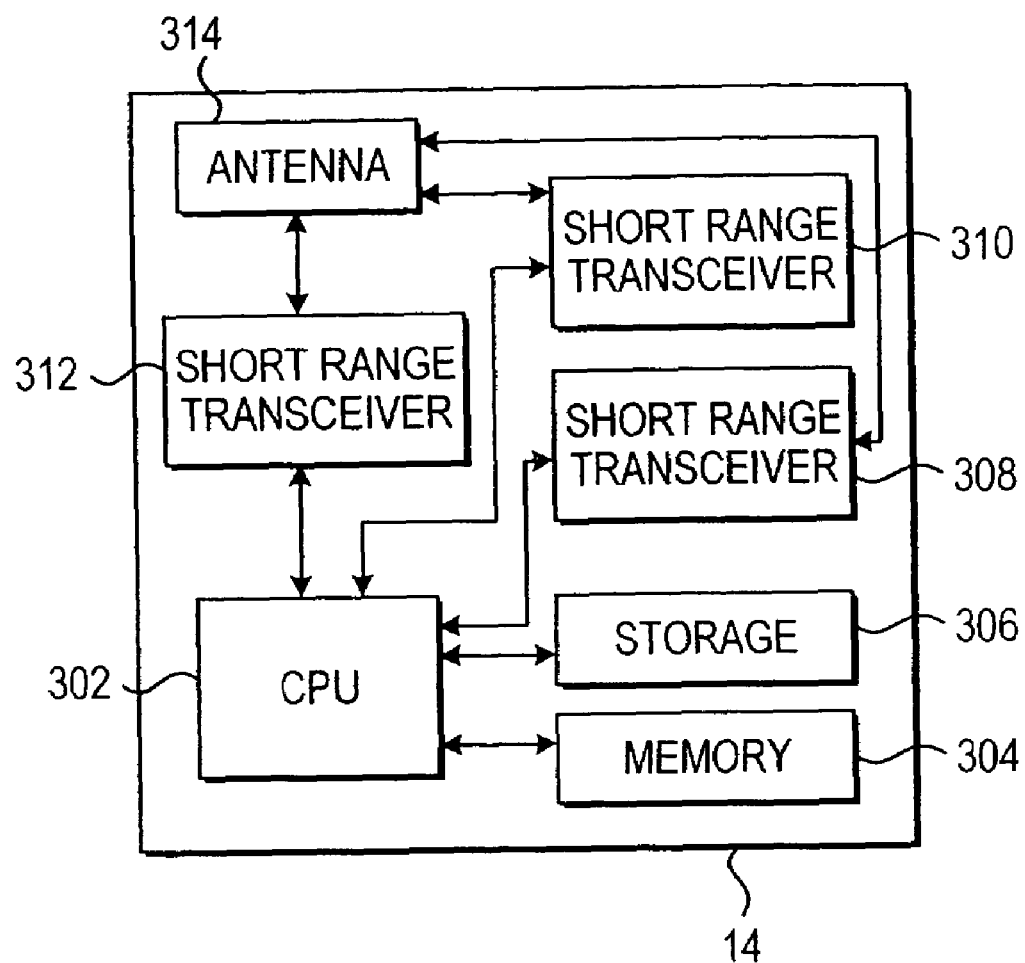
FIG. 4 is an illustration of an information beacon in accordance with the inventive system.

A detail of a preferred beacon device 14 is illustrated in FIG. 4. The beacon includes a central processing unit (CPU) 302 interfaced with one or more short range transceivers 308, 310, 312 for communicating with other beacons 14 or hosts 12. A memory 304 and storage area 306 are provided for storing application software as well as data to be communicated to intended recipients, as explained more fully below.

Each beacon functions as a transceiver device and is operable in a corresponding region 5 (shown in FIG. 1), typically defined by the radius of its transmission range. Thus, for a 10 meter operating range, each beacon 14 will be able to communicate with devices contained within a circular geographic area defined by the operating range and centered at the location of the beacon 14. Such communication may be between a subject beacon (e.g. beacon $14b_3$) and one or more neighboring beacons (e.g. $14b_2, 14b_4$) or between a subject beacon and one or more mobile devices such as, for example, a personal digital assistant (PDA) or mobile telephones shown as $P_1$ and $P_2$.

Figure 5:
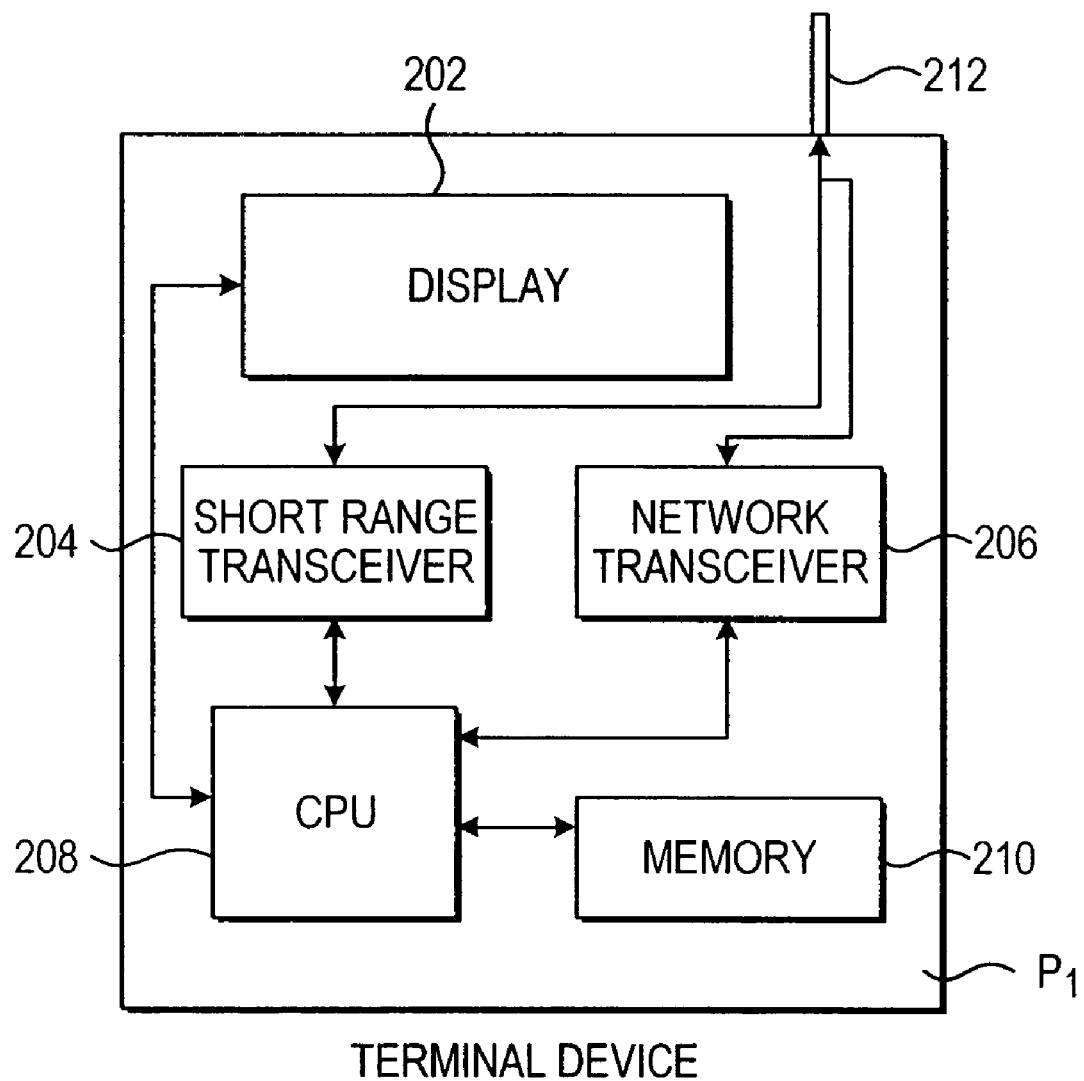
FIG. 5 is an illustration of a terminal device for use with the inventive system.

A detail of the terminal device or mobile phone $P_1$ is illustrated in FIG. 5. As shown, the mobile phone includes a display 202, such as an LCD display as is known in the art, a central processing unit (CPU) 208 and a memory 210. Standard mobile transmission and reception occurs via a network transceiver 206 connected to an antenna 212, and short messaging for communication with a subject beacon 14 is conducted via a short range transceiver 204 connected to the antenna.

For the mobile devices to communicate with the beacon or with the network 10, each device will have a designated address code, such as an e-mail address. As shown in FIG. 2, telephone $P_1$ is illustratively located within the operating ranges of beacons $14b_3$ and $14b_4$ and telephone $P_2$ is illustratively located within the operating range of beacon $14b_3$. It will be appreciated that as the telephones $P_1, P_2$ are mobile devices, their exact positions relative to specific beacons are dynamically changing as a telephone user moves about an environment in which the information beacons 14 or the network 10 operates. Thus, at a later time telephone $P_2$ may be in the operating range of beacon $14b_1$ while telephone $P_1$ moves within the operating range of beacon $14c_1$.

Each beacon 14 functions as a store and forward device for providing communication of messages between the mobile devices $P_1, P_2$. The messages may be intended for receipt by one or more specific or designated recipients based on the recipient identification ("private messages") or may be accessible to multiple recipients without the requirement of recipient identification ("public messages"). The communication of both types of messages are discussed more fully below.

To communicate with the beacons 14, the mobile devices include a low power infrared or RF communication feature, such as Bluetooth, as is known in the art. It is presently contemplated that communication between a mobile device and a particular beacon will be limited to relatively short text messages in a manner analogous to the Short Message Service available in present GSM systems, but may also include audio messages and larger text messages. To forward a private message to a particular beacon (e.g. $14b_3$) from device $P_1$, the device must be capable of communicating either directly or indirectly with beacon $14b_3$. This is accomplished by activating a low power RF communication feature of the device $P_1$ (e.g. a Bluetooth chip) and positioning the device $P_1$ within the operating range of beacon $14b_3$. A text or audio message can then be created and transmitted, in a known manner, along with an address (e.g., e-mail address) of an intended recipient, for temporary storage in a memory location of the receiving beacon ($14b_3$). The message can be designated for storage on a particular beacon (e.g., $14b_3$) or for storage on some or all beacons in direct or indirect communication with beacon $14b_3$, e.g., a broadcast message to a plurality of beacons.

As an alternative to directly communicating with beacon $14b_3$ and transmitting a message for storage, indirect communication can occur by, for example, transmitting a message through the network 10 to beacon $14b_4$ and providing a destination address to allow the message to be forwarded to beacon $14b_3$. This allows for the message sender (i.e. the operator of device $P_1$) to be in the operating range of beacon $14b_4$ and not within the operating range of beacon $14b_3$. One circumstance in which this feature may be useful is in coordinating a time for a meeting scheduled to take place within an operating environment of the network 10. For example, if a meeting place within the operating range of beacon 14$b_3$ was previously scheduled by a party who is within the operating range of a remote beacon (e.g. beacon 14$b_1$,) and who is going to be delayed, the delayed party can forward a message through beacon 14$b_1$ to beacon 14$b_3$ via communication links 20$b_4$, 20$b_2$, to inform an intended recipient that there will be a delay to the meeting.

For private messages which are intended to be selectively received by one or more intended recipients (e.g. a select group), the message must be stored on a desired beacon and retrieved from the desired beacon in a manner for preventing unintended mobile devices from gaining access to the message. To accomplish this task in accordance with the present invention, secrecy or encoding techniques are employed. Although a plurality of such techniques are widely available, the presently preferred embodiment utilizes PGP encryption for this purpose. This requires the message sender and recipient(s) to be previously identified to each other by exchanging so-called "public keys" which the respective sender will use to encrypt and transmit a message to a beacon for storage. Upon transmission of the stored message to the intended recipients, the intended recipients will be able to decode the message upon entry of a password, as is known in the art.

One of the various alternatives to PGP encryption is assigning each user address (e.g. e-mail address) with a corresponding password that will be used to access a message stored by a sender. In such a system, the sender will use the recipient's e-mail address to transmit the message to a desired beacon for storage and the recipient will gain access to the message by entering the recipient's password. Thus, the password will be entered onto the recipient's device (e.g., $P_2$) when access to messages is desired. The verification of the password is preferably performed in the recipient device, which will insure that the beacon architecture design can remain relatively simple and transparent with standard memory and transceiver electronics (e.g., Bluetooth chips) without requiring the storing of operation of verification software for confirming password validity, etc. However, password verification at the recipient device may pose certain security risks, especially if the password is saved in memory contained in the recipient device. To alleviate or reduce this risk, the mobile devices may contain security information in the device application software necessary to guarantee the user identity such as by including a hard-coded security algorithm that is unable to be duplicated.

As explained above, private messages are intended to be received by one specific recipient or by a group of recipients. Private messages are transmitted from a subject beacon (e.g., 14$b_3$), or in the case of a broadcast message which is stored on a plurality of subject beacons, to an intended recipient when the intended recipient enters into the operating range of the beacon and the intended recipient device is detected. To accomplish this, the intended recipient device must be activated for automatic access, i.e. the Bluetooth function or the infra-red function is operating, to identify the recipient device to the transmitting beacon. Once the recipient device is identified (e.g., "connected' to the network 10), the private message will be transmitted automatically from one of the subject beacons containing the private message. After receipt, the message can be decrypted such as by entering an encryption password on an input (e.g. a keyboard) of the receiving device, whereupon the message is conveyed to the recipient in text, audio or other format. After the recipient receives a private message, a reply can be sent solely to the transmitting beacon or as a broadcast signal to multiple beacons for receipt by the message originator, by utilizing the message originator's address and the sender's password.

Figure 3:
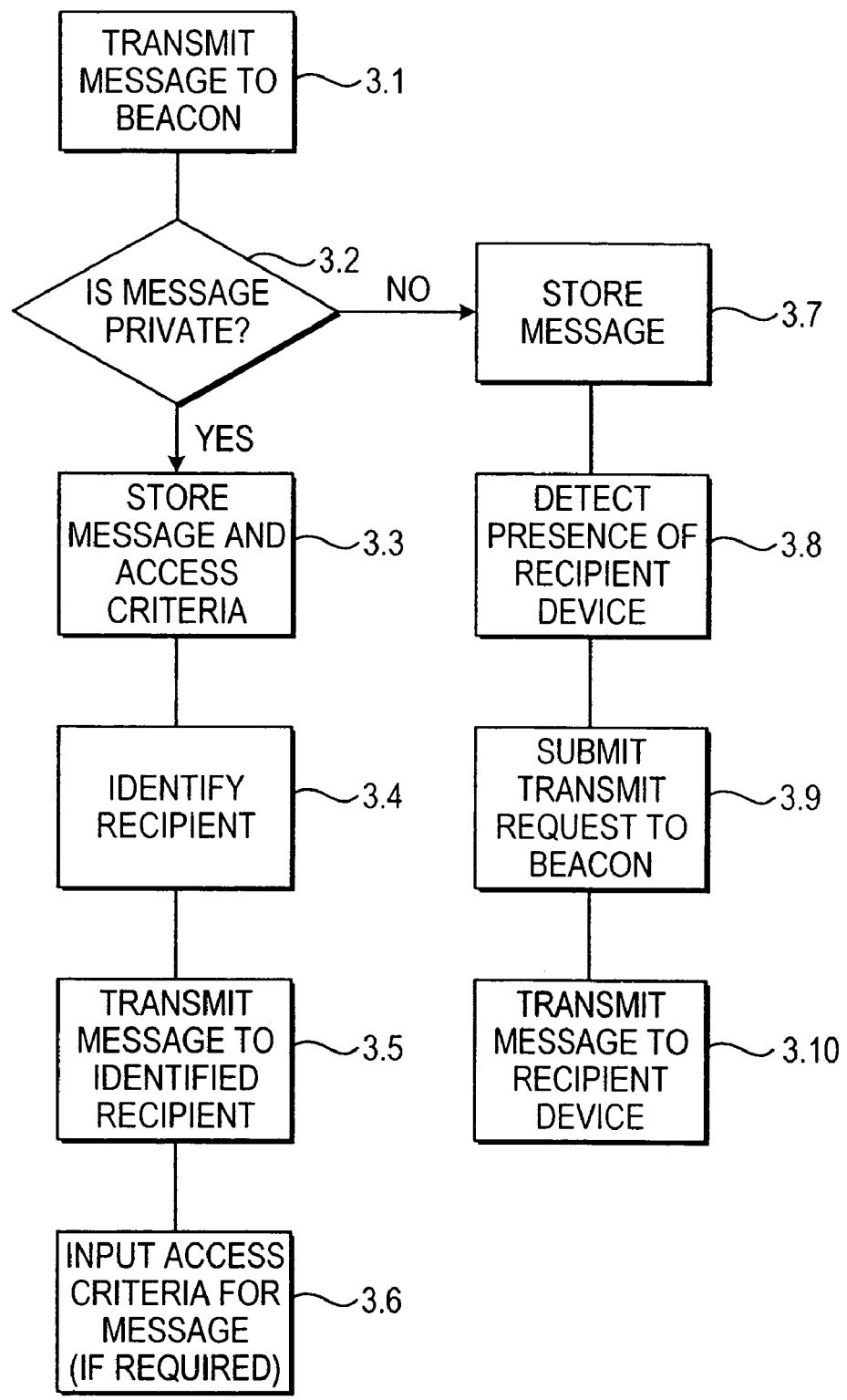
FIG. 3 is a flow chart illustrating the communication functions in accordance with the present invention.

The inventive method described above for communicating a private message from a sender to a recipient through the use of a beacon is illustrated in FIG. 3. When a private message is prepared by a sender, it is encrypted and transmitted to a designated beacon. The transmission may occur directly between a sender's device and the designated beacon by transmitting the message (step 3.1) within a corresponding operating range of the beacon, or indirectly, as explained above, via use of another beacon in communication with the designated beacon. A determination as to whether the message is private will then be made (step 3.2) by detecting, for example, a security code or an encryption format. The private message will then be stored in memory on the designated beacon with a security code (step 3.3). When an activated recipient device enters the operating range of the designated beacon, the beacon will sense or become aware of the recipient (step 3.4) by detecting, for example, a Bluetooth signature, SIM card or other corresponding address code associated with the intended recipient or recipient device, and transmit the stored message (step 3.5). Upon receipt, the recipient can enter a decryption code or password, if required, to decipher or gain access to the received message (step 3.6).

Once the private message is successfully transferred, it will either be deleted from the beacon memory, as in the case of only one intended recipient, or will no longer be available to the recipient that received the message but will still be available to other intended recipients. As a further safeguard against exceeding the memory storage capacity of the beacons, the private messages may be created with or may have a standard time delivery limitation. For example, a message sender may set a time parameter for a message to be available for a time duration (e.g., 2 hours) or up to a specific time (e.g. 2:00 P.M.). Moreover, each beacon can be designed to delete private messages after a preset time period expires (e.g. after 3 hours, at 12:01 A.M. of every day, etc.).

While the delivery of private messages involves security concerns to safeguard against non-intended recipients receiving messages, the communication of "public" messages do not possess such concerns. Public messages may be used, for example, in advertising, to inform potential customers of sales promotions offered by an establishment proximate a specific beacon. As users enter the operating area of the specific beacon the user may obtain access, in a manner explained more fully below, to a message describing the particular sales promotion. Public messages may also include for example general information related or tailored to a geographic location containing the subject beacon, such as providing mass transit time tables for trains or buses departing from or arriving at the geographic location, as well as theater performance times, for events at a theatre in the operating range of the subject beacon, etc.

Figure 6:
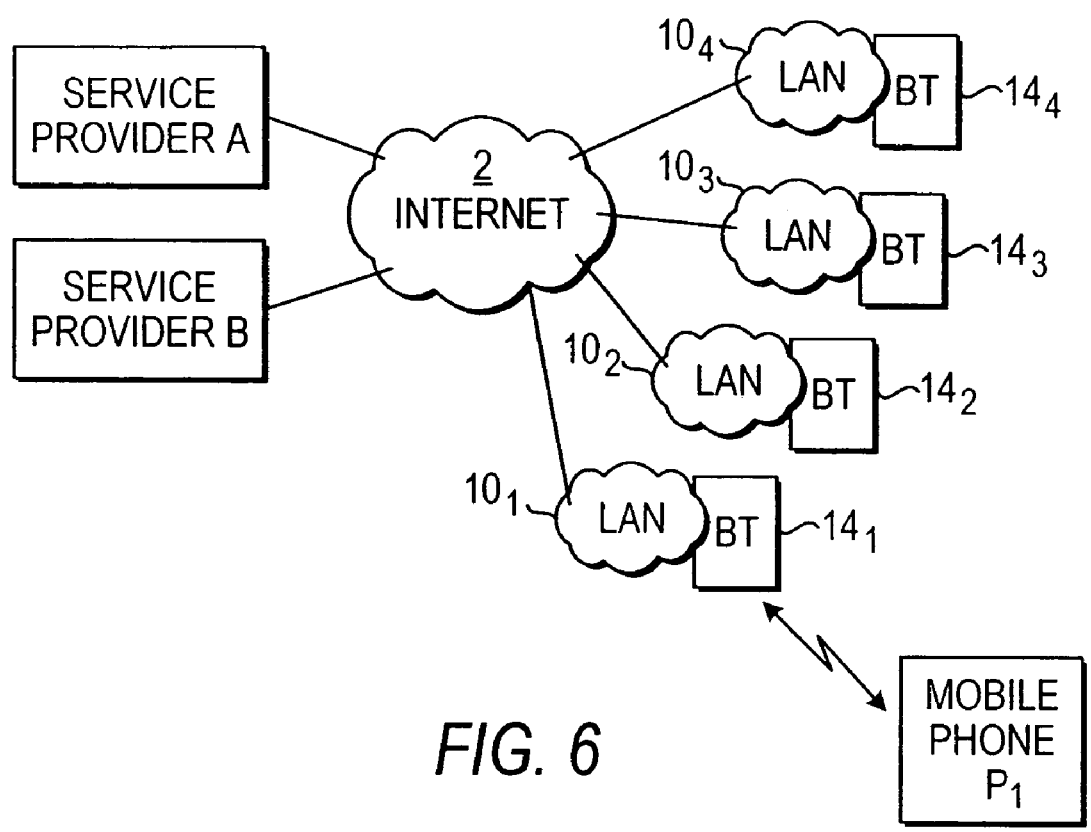
FIG. 6 is a schematic representation of a plurality of remotely accessible short-range RF networks.

Although intended recipients of private messages are preferably alerted when they enter into an operating range of a beacon, recipients of public messages may be required to request delivery of public messages. The public messages can be created by, for example, a service provider of one or more networks 10 and stored in location specific destinations to maximize user accessibility and use of the public messages. With reference to FIG. 6, for example, a system is depicted having a plurality of networks or LANs (10$_1$, 10$_2$, 10$_3$, 10$_4$) each containing a plurality of beacons (in FIG. 6, only one beacon BT is shown for each LAN as 14$_1$, 14$_2$, 14$_3$, $14_4$, respectively). The LANs are connected through the Internet 2 to one or more service providers which operate the LANs. The service providers preferably operate the LANs and may also control the public messages intended for storage on the individual beacons. Thus, if a commercial establishment desires to have a particular public message posted on a beacon (e.g. a beacon having a transmission area in which the commercial establishment or a competitor is located), the appropriate service provider would be contacted. The service provider can then access the desired LAN and beacon, such as via the Internet using appropriate software applications and addresses, to store the desired message. If one of the networks (e.g. LAN $10_1$,) operates in a shopping center containing various types of retail establishments, public messages may be created and strategically placed at appropriate beacons (e.g., BT $14_1$) positioned proximate certain retail establishments to alert potential patrons in the vicinity of the specific retail establishments of available promotional offers. For example, a public message containing information on a clothing sale offered by a store, proximate a specific information beacon containing the message will be transmitted to devices (e.g., $P_1$) that are within the operating range of the specific beacon $14_1$. This process is generally depicted in steps 3.7–3.10.

In one alternative, the public messages may be stored in categories by subject matter. Access to messages can then be requested by a recipient when the recipient enters into the operating range of a specific beacon. For example, a recipient can execute a command on a terminal device to receive a category list or menu of messages (e.g. clothing offers, food promotion, etc.) and then select the category of messages to be transmitted by the beacon. Once the category is transmitted, the messages in the category can be viewed and a particular message can be selected for transmission by the beacon to the recipient device. Alternatively, public messages can be automatically transferred to a recipient device upon entry of the recipient into the operating area of the beacon, i.e. without requiring the user to initiate a request to the beacon.

The network 10 also functions as an electronic message center or "bulletin board" wherein users can access information posted by other users (either directly or through the service providers) on one or more beacons which are strategically located in high user traffic areas such as an entrance to a shopping center. As an example, if a user wants to post a message or advertisement concerning the user's sale of an item, such as furniture, the user will send a short message request to a desired beacon where the advertisement is to be stored. The user may then receive a message from the beacon containing an information solicitation form seeking certain information from the user (e.g. the price of the item for sale and, optionally, a digital image of the item). The information is then provided by the user to the beacon for storage. When a second user enters the operating range of the subject beacon containing the first user's stored message, the second user may send a SMS message request to the beacon for all "sale" items. The second user will receive, in response, a message containing a list of categories for sale items. The user can then scroll through the list to find the "furniture" category and then select the desired message, whereupon the beacon will transmit the first user's message to the second user's mobile phone.

For public messages, a beacon may be designated as an "information beacon" which functions as a storing device and which is in communication, either directly or indirectly with other beacons in the network. Thus, a recipient of a public message can communicate a request, through a beacon presently servicing the recipient device, to transmit all or select public messages to the recipient device. This will cause the select public messages to be retrieved from the information beacon and transmitted, either directly or indirectly, to the recipient device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of wireless communication in a local environment, comprising the steps of:

positioning an information beacon in a certain location, said information beacon having a memory and a wireless short-range transceiver and being capable of transmitting messages in a local operating region associated with said beacon;

receiving, by said beacon, a public message from a sender device when the sender device or an intermediate device capable of communicating with the sender device is within the local operating range of said beacon, wherein the public message is addressed to be accessible by any wireless communication device present within the local operating region of said beacon;

storing, by said beacon, the received public message;

detecting, by said beacon, a presence of a wireless communication device when the wireless communication device enters the operating region of said beacon, without said beacon communicating with any remotely located device; and wirelessly transmitting, by said beacon, a message including at least an indication of the availability of the stored public message to the wireless communication device when the presence of the wireless communication device has been detected.

2. The method of claim 1, wherein the message comprises the stored public message.

3. The method of claim 2, further comprising the steps of:

receiving at said beacon, a message request from the wireless communication device upon entering the operating region of said beacon for seeking a public message; and transmitting the stored public message from said beacon to the wireless communication device in response to the received message request.

4. The method of claim 2, wherein said storing step comprising storing the public message for a certain time period.

5. The method of claim 2, wherein the wireless communication device comprises a mobile phone.

6. A method of communicating a public message from a sender device to a wireless communication device in a wireless local area network having a plurality of wireless beacons in communication with each other and a host, with each beacon containing a memory, and a transceiver, and being operable in a corresponding operating region, comprising the steps of:

wirelessly transmitting the public message from the sender device to said host;

wirelessly transmitting the public message from said host to a specific one of said plurality of beacons;

detecting, by said specific one beacon, a presence of the wireless communication device when the wireless communication device enters the operating region of said specific one beacon, without requiring communication between said host and said specific one beacon during said detecting step; and wirelessly transmitting, by said specific one beacon, a message including at least an indication of the availability of the stored public message to the wireless communication device when the presence of the wireless communication device has been detected.

7. The method of claim 6, wherein the message comprises the public message.

8. The method of claim 7, further comprising the steps of:

receiving at said specific one beacon, a message request from the wireless communication device upon entering the operating region of said specific one beacon for seeking a public message; and transmitting the public message from said specific one beacon to the wireless communication device in response to the received message request.

9. The method of claim 7, wherein the public message is only available for transmission to the wireless communication device for a specific time period.

10. The method of claim 7, wherein the wireless communication device comprises a mobile phone.

11. A system for wireless communication in a local environment, comprising:

an information beacon positioned in a certain location, said information beacon having a memory and a wireless short-range transceiver and being capable of transmitting messages in a local operating region associated with said beacon;

means for receiving, by said beacon, a public message from a sender device when the sender device or an intermediate device capable of communicating with the sender device is within the local operating range of said beacon, wherein the public message is addressed to be accessible by any wireless communication device present within the local operating region of said beacon;

means for storing, by said beacon, the received public message;

means for detecting, by said beacon, a presence of a wireless communication device when the wireless communication device enters the operating region of said beacon, without said beacon communicating with any remotely located device; and means for wirelessly transmitting, by said beacon, a message including at least an indication of the availability of the stored public message to the wireless communication device when the presence of the wireless communication device has been detected by said detecting means.

12. The system of claim 11, wherein the message comprises the stored public message.

13. The system of claim 12, further comprising:

means for receiving at said beacon, a message request from the wireless communication device upon entering the operating region of said beacon for seeking a public message; and means for transmitting the stored public message from said beacon to the wireless communication device in response to the received message request.

14. The system of claim 12, wherein said means for storing comprises means for storing the public message for a certain time period.

15. The system of claim 12, wherein the wireless communication device comprises a mobile phone.

16. A system of communicating a public message from a sender device to a wireless communication device in a wireless local area network having a plurality of wireless beacons in communication with each other and a host, with each beacon containing a memory, and a transceiver, and being operable in a corresponding operating region, comprising:

means for wirelessly transmitting the public message from the sender device to said host;

means for wirelessly transmitting the public message from said host to a specific one of said plurality of beacons;

means for detecting, by said specific one beacon, a presence of the wireless communication device when the wireless communication device enters the operating region of said specific one beacon, without requiring communication between said host and said specific one beacon; and means for wirelessly transmitting, by said specific one beacon, a message including at least an indication of the availability of the stored public message to the wireless communication device when the presence of the wireless communication device has been detected by said detecting means.

17. The system of claim 16, wherein the message comprises the public message.

18. The system of claim 17, further comprising:

means for receiving at said specific one beacon, a message request from the wireless communication device upon entering the operating region of said specific one beacon for seeking a public message; and means for transmitting the public message from said specific one beacon to the wireless communication device in response to the received message request.

19. The system of claim 17, wherein the public message is only available for transmission to the wireless communication device for a specific time period.

20. The system of claim 17, wherein the wireless communication device comprises a mobile phone.

21. A method of communicating a public message from a sender device to a wireless communication device in a wireless local area network having a plurality of wireless beacons in communication with each other and a host, with each beacon containing a memory, and a transceiver, and being operable in a corresponding operating region, comprising the steps of:

wirelessly transmitting the public message from the sender device to said host;

wirelessly transmitting the public message from said host to a specific one of said plurality of beacons;

detecting, by said specific one beacon, a presence of the wireless communication device when the wireless communication device enters the operating region of any one of the wireless beacons in said plurality of wireless beacons, without requiring communication between said any one wireless beacon and any other device; and wirelessly transmitting, by said any one wireless beacon, a message including at least an indication of the availability of the stored public message to the wireless communication device when the presence of the wireless communication device has been detected.

* * * * *